_United States Patent Office_

3,419,545
Patented Dec. 31, 1968

3,419,545
PROCESS OF PREPARING 7-HALO-2-DIMETHYL-AMINO - 5-PHENYL-3H-1,4-BENZODIAZEPINE 4-OXIDES
Sheldon Farber, Morristown, N.J., assignor to Warner-Lambert Pharmaceutical Company, Morris Plains, N.J., a corporation of Delaware
No Drawing. Filed May 29, 1961, Ser. No. 113,152
4 Claims. (Cl. 260—239)

The present invention relates to a new and novel process of preparing 7-halo-2-dimethylamino-5-phenyl-3H-1,4-benzodiazepine 4-oxides of the formula:

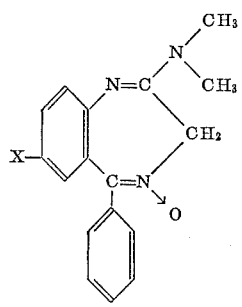

wherein X is halogen, for example fluorine, chlorine, bromine or iodine. These compounds have significant pharmacological activity and are useful as sedatives, as well as being valuable intermediates useful in the preparation of other 1,4-benzodiazepine 4-oxide derivatives. The compounds of the above formula are described and claimed in the application of Heinz M. Wuest entitled "7-halo-5-phenyl-3H-1,4-benzodiazepine 4-oxide derivatives," application Ser. No. 121,284, filed May 29, 1961.

I have found that the compounds of the above formula may be prepared from 6-halo-2-halomethyl-4-phenylquinazoline 3-oxide starting materials of the formula:

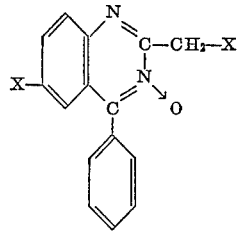

wherein X and Y are halogen, for example fluorine, chlorine, bromine or iodine by treatment with dimethylamine at a temperature of −10° C. to −50° C. for about 1 to about 10 days.

Starting materials of the above formula are described in U.S. Patent No. 2,893,992.

The reaction is carried out in an inert organic solvent with lower aliphatic alcohols such as methanol and ethanol being preferred. We have found that the reaction temperature is critical and should be maintained between −10° C. and −50° C. and preferably between −25° C. and −40° C. At temperatures above −10° C., the yield of the desired product is reduced to an insignificant value due to side reactions. At temperatures below −50° C., there is no evidence of any reaction whatever.

The following example is included in order further to illustrate the present invention:

Example 3.0 g. of 6-chloro-2-chloromethyl-4-phenylquinazoline 3-oxide is added to a solution of 6.5 g. dimethylamine in 200 ml. methanol at a temperature of −33° C. The mixture is maintained at −33° C. for 6 days by immersing the reaction vessel in a bath of liquid ammonia. The mixture is then filtered and the solids (2.5 g.) are dried at room temperature under vacuum. Recrystallization from acetonitrile yields 0.65 grams of pure 7-chloro-2-dimethylamino-5-phenyl-3H-1,4-benzodiazepine 4 - oxide, melting point, 206–210° C.

Analysis.—Calcd.: C, 65.07; H, 5.14; N, 13.39; Cl, 11.30. Found: C, 65.22; H, 5.36; N, 13.35; Cl, 11.30.

It is understood that the foregoing detailed description is given merely by way of illustration and that many variations may be made therein without departing from the spirit of my invention.

Having described my invention, what I desire to secure by Letters Patent is:

1. A method of preparing 7-halo-2-dimethylamino-5-phenyl-3H-1,4-benzodiazepine 4-oxide which comprises treating a solution of 6-chloro-2-chloromethyl-4-phenyl-azoline 3-oxide in an inert solvent with dimethylamine at a temperature between −10° C. and −50° C.

2. A method of preparing 7-chloro-2-dimethylamino-5-phenyl-3H-1,4-benzodiazepine 4-oxide which comprises treating a solution of 6-chloro-2-chloromethyl-4-phenylquinazoline 3-oxide in a lower aliphatic alcohol with dimethylamine at a temperature between −10° C. and −50° C.

3. A method according to claim 2 wherein said lower aliphatic alcohol is methanol and the reaction temperature is −25° C. to −40° C.

4. The process of preparing a compound of the formula

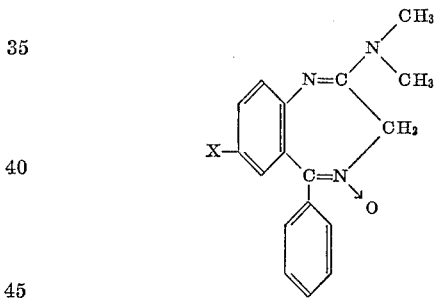

wherein X is halogen which comprises reacting a compound of the formula

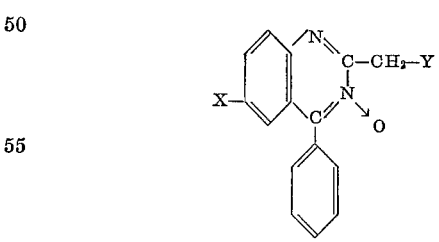

wherein X and Y are halogen with dimethylamine in the presence of a lower alkanol at a temperature of about −50° C.

References Cited
UNITED STATES PATENTS 2,893,992    7/1959    Sternbach ---------- 260—239

ALTON D. ROLLINS, _Primary Examiner._

U.S. Cl. X.R.
167—65